United States Patent [19]

Martino et al.

[11] 4,243,516

[45] Jan. 6, 1981

[54] CATALYTIC HYDROREFORMING PROCESS

[75] Inventors: Germain Martino, Poissy; Jean Miquel, Paris, both of France

[73] Assignee: Societe Francaise des Produits pour Catalyse, Rueil-Malmaison, France

[21] Appl. No.: 858,126

[22] Filed: Dec. 6, 1977

[30] Foreign Application Priority Data

Dec. 6, 1976 [FR] France ............................. 76 36918

[51] Int. Cl.$^3$ .............................................. C10G 35/08
[52] U.S. Cl. ................................... 208/139; 252/441
[58] Field of Search ........................................ 208/139

[56] References Cited

U.S. PATENT DOCUMENTS 4,149,961   4/1979   Antos ................................... 208/139

Primary Examiner—Curtis R. Davis
Attorney, Agent, or Firm—Millen & White

[57] ABSTRACT

Catalytic hydroreforming process, particularly for the production of gasoline of high clear octane number, comprising hydrogenating a hydrocarbon charge in the presence of a catalyst containing an alumina carrier, a first metal selected from ruthenium, iridium and rhodium, a second metal, different from the first metal, and selected from ruthenium, palladium and osmium, a third metal consisting of indium, and a halogen.

8 Claims, No Drawings

CATALYTIC HYDROREFORMING PROCESS

This invention concerns a new catalytic reforming process and catalysts therefore as well as a catalytic process for manufacturing aromatic hydrocarbons in the presence of these new catalysts. These processes are conducted at a temperature from 450° to 600° C. under a pressure from 1 to 60 kg/cm$^2$ at an hourly space velocity from 0.1 to 10 volumes of liquid charge per volume of catalyst, the ratio hydrogen/hydrocarbons being from 0.5 to 20.

More precisely, the new catalysts are useful in:

Reforming reactions: the operating conditions of the hydroreforming reactions are more particularly as follows: average temperature from about 450° to 580° C., pressure from about 5 to 20 kg/cm$^2$, hourly velocity from 0.5 to 10 volumes of liquid naphtha per volume of catalyst and recycling rate from 1 to 10 moles of hydrogen per mole of charge. The charge is generally a naphtha distilling between about 60° C. and about 220° C., particularly a straight run naphtha.

Reactions for producing aromatic hydrocarbons from saturated or unsaturated gasolines (for producing benzene, toluene and xylenes). When the charge is unsaturated, i.e. when it contains diolefins and monolefins, it must be made free thereof in a first step by selective or complete hydrogenation. Then the charge, made free of substantially all diolefins and monoolefins contained therein, if any, is subjected to a treatment with hydrogen in the presence of a catalyst at a temperature from about 530° to 600° C. under a pressure from 1 to 60 kg/cm$^2$, the hourly volume feed rate of the liquid charge being of the order of 0.1 to 10 times the volume of the catalyst, the molar ratio hydrogen/hydrocarbons being of the order from 0.5 to 20. The feed-stock may consist of gasoline from cracking pyrolysis, particularly steam-cracking or catalytic reforming, or may consist of naphthenic hydrocarbons convertible into aromatic hydrocarbons by dehydrogenation.

Catalysts containing platinum deposited on alumina are known since a long time. In spite of numerous improvements to these catalysts, for example by incorporation of such additives as rhenium, germanium, tungsten, molybdenum and of many other metals pertaining to any group of the periodic classification of elements, efforts are still made today in order to find new catalysts which, on the one hand, would result in still higher yields than those obtained up to now and which, on the other hand, would also benefit of a longer life time than that of the known catalysts. Moreover, there is an attempt to improve the mechanical properties of these catalysts in order to make possible their use in movable bed, in the form of conglomerates, for example balls or extrudates of substantial size so as to leave a relatively easy passage-way to the gaseous reactants. The wear of these catalysts will result in the formation of grains of a much smaller size which progressively clog the free space and make it necessary to increase the input pressure of the reactants or even to discontinue the operation. Although it was known that in reforming reactions, high yields were obtained by using a catalyst with a porous carrier (particularly alumina) containing, for example, simultaneously platinum (or another noble metal of the platinum family), and another metal such as, for example, copper, gold, silver and iridium, it has now been discovered that, when proceeding particularly with a movable bed in the presence of other specific catalysts, the latter exhibited, in the reactions of hydroforming and of producing aromatic hydrocarbons, an increased activity and particularly an increased life-time as compared to the catalysts of the prior art.

The specific catalyst used according to this invention includes an alumina carrier, two different noble metals from the platinum family selected from ruthenium, iridium, rhodium, palladium and osmium, a third metal which is indium and a halogen, for example chlorine or fluorine.

The catalyst according to the invention contains, expressed by weight with respect to the alumina carrier, (a) from 0.005 to 1%, preferably from 0.05 to 0.8% and, more particularly, from 0.2 to 0.4% of a first metal of the platinum family selected from ruthenium, iridium and rhodium, (b) from 0.005 to 0.8%, preferably 0.01 to 0.7% and more particularly, from 0.03 to 0.2% of a second metal of the platinum family different from said first metal, said second metal being selected from ruthenium, rhodium, palladium and osmium, (c) from 0.005 to 5%, preferably 0.05 to 4%, more particularly from 0.07 to 2%, or more preferably from 0.2 to 0.6% of a third metal consisting of indium and (d) from 0.1 to 10% and preferably 0.2 to 5% by weight, with respect to the catalyst carrier, of a halogen for example chlorine or fluorine.

The textural characteristics of the catalyst carrier may also be of importance: in order to proceed with sufficiently high space velocities, to avoid the use of reactors of a too large capacity and the use of an excessive catalyst amount, the specific surface of the carrier may be advantageously in the range from 50 to 600 m$^2$/g, preferably from 150 to 400 m$^2$/g.

The catalyst may be prepared according to conventional methods consisting of impregnating the carrier with solutions of compounds of the metals to be introduced. This introduction may be achieved by means of a common solution of the metals or of a separate solution of each metal. When using several solutions, intermediate drying and/or calcination steps may be performed. Usually the final step consists of a calcination, for example between about 500° and 1,000° C., preferably in the presence of free oxygen, for example under air scavenging.

Examples of metal compounds included in the catalyst composition, are, for example, nitrates, chlorides, bromides, fluorides, sulfates or acetates of these metals or even any other salt or oxide of these metals which is soluble in water, hydrochloric acid or in any other suitable solvent (chlororuthenate, chloroiridic acid, osmic acid, amino complexes and other organic and inorganic complexes).

The halogen of the catalyst may be supplied by one of the metal halides, when the metal is contained in one of the halides, or may be supplied by addition of hydrochloric acid, hydrofluoric acid, ammonium chloride, ammonium fluoride, gaseous chlorine or a hydrocarbon halide, for example $CCl_4$, $CH_2Cl_2$ or $CH_3Cl$.

A first preparation method consists, for example, of impregnating the carrier with an aqueous solution of indium nitrate or another indium compound, drying at about 120° C. and calcining in air for a few hours at a temperature from 500° to 1,000° C., preferably at about 700° C.; a second impregnation step will be conducted subsequently by means of a solution containing the two noble metals of the platinum family.

Another method consists, for example, of impregnating the carrier by means of a solution simultaneously containing the three metals of the catalyst.

Still another method consists of introducing the metal elements by proceeding to a number of successive impregnations equal to the number of metal elements of the catalyst.

The following examples illustrate the invention without being limitative of the scope thereof.

In examples 1 to 5, the feed-stock subjected to the treatment is a naphtha having the following characteristics:

| - A.S.T.M. distillation | 80–160° C. |
|---|---|
| - Composition : aromatic hydrocarbons | 7% by weight |
| naphthenic hydrocarbons | 27% by weight |
| paraffinic hydrocarbons | 66% by weight |
| - "Clear research" octane number | about 37 |
| - Average molecular weight | 110 |
| - Specific gravity at 200° C. | 0.782 |

In these examples, the feed-stock is passed with recycled hydrogen over various reforming catalysts, according to the invention or not, which all include an alumina carrier, have a specific surface of 200 m²/g, a pore volume of 0.58 cc/g and a chlorine content of 1.12% (they have been prepared by using alumina having a specific surface of 230 m²/g and a pore volume of 0.60 cc/g).

The reforming reaction in examples 1 to 5 is conducted so as to obtain a clear octane number of 96.2. The operating conditions are as follows:

| - Pressure | 20 bars |
|---|---|
| - Ratio H$_2$/hydrocarbons (moles) | 5 |
| - Naphtha weight/catalyst weight/hour | 3 |

The inlet temperature in the reactor is 490° C.±1° C. (It suffices to increase it progressively up to 530° C. to maintain a constant octane number).

The following tables report for different examples, including the use of various catalysts, the yield of C$_5$+ and the hydrogen content, in percent, of the recycled gas, when the desired octane number has been obtained.

EXAMPLE 1 (comparative)

In this example, which is not conform with the invention, there is used a platinum-containing conventional catalyst No. 1 as well as various catalysts No. 2 to No. 15 containing two metals of the platinum family. The metal contents are given in Table I which also indicates the yield of C$_5$+ and the hydrogen content of the recycled gas, during the treatment of the charge. It is observed in particular that among catalysts 2 to 15, only the combinations of a second noble metal associated to platinum give results equivalent to or higher than those obtained when using platinum alone, platinum being the metal generally used in reforming operations. The metal combinations where platinum is absent are not satisfactory.

TABLE I

| CATA-LYST No | METAL COMPOSITION IN % BY WEIGHT WITH RESPECT TO THE CATALYST CARRIER | | YIELD % C$_5$+(weight) | RECYCLED GAS % H$_2$ (Moles) |
|---|---|---|---|---|
| 1 | 0.35 platinum | — | 81.8 | 81.6 |
| 2 | 0.30 platinum | 0.05 osmium | 81.6 | 81.5 |
| 3 | 0.30 platinum | 0.05 palladium | 81.2 | 80.9 |
| 4 | 0.30 platinum | 0.05 rhodium | 81.5 | 81.6 |
| 5 | 0.30 platinum | 0.05 ruthenium | 81.7 | 81.7 |
| 6 | 0.30 platinum | 0.05 iridium | 81.9 | 81.8 |
| 7 | 0.30 iridium | 0.05 ruthenium | 79.5 | 78.3 |
| 8 | 0.30 iridium | 0.05 pallidium | 79.8 | 79.1 |
| 9 | 0.30 iridium | 0.05 rhodium | 79.2 | 78.1 |
| 10 | 0.30 iridium | 0.05 osmium | 78.9 | 78.3 |
| 11 | 0.30 rhodium | 0.05 palladium | 79.6 | 79.0 |
| 12 | 0.30 rhodium | 0.05 osmium | 78.9 | 79.2 |
| 13 | 0.30 rhodium | 0.05 ruthenium | 79.2 | 78.4 |
| 14 | 0.30 ruthenium | 0.05 palladium | 80.4 | 79.8 |
| 15 | 0.30 ruthenium | 0.05 osmium | 80.7 | 80.2 |

EXAMPLE 2 (comparative)

In this example, which is not in accordance with the invention, catalysts No. 16 to 21 are used. The catalysts all contain indium which has been added either to a catalyst which contains only platinum (catalyst 16) or to catalysts containing both platinum and a second metal of the platinum family (catalysts 17 to 21), i.e. in said example 2, indium has been added to the best catalysts 1 to 7 of example 1. The metal contents of these catalysts and the corresponding yields are reported in table II below.

It is observed that in all of these examples conducted in the presence of catalysts 16 to 21, the yields of C$_5$+ and the hydrogen content of the recycled gas are improved by addition of indium as compared to the results obtained with indium free catalysts 1 to 7.

TABLE II

| CATA-LYST No | METAL CONTENT IN % BY WEIGHT RELATIVE TO THE CATALYST CARRIER | | | YIELD % C$_5$+ (weight) | RECYCLED GAS % H$_2$ (Moles) |
|---|---|---|---|---|---|
| 16 | 0.35 platinum | — | 0.5 indium | 82.3 | 82.6 |
| 17 | 0.30 platinum | 0.05 osmium | 0.3 indium | 82.6 | 82.5 |
| 18 | 0.30 platinum | 0.05 palladium | 0.3 indium | 81.8 | 81.6 |
| 19 | 0.30 platinum | 0.05 rhodium | 0.3 indium | 82.3 | 82.5 |
| 20 | 0.30 platinum | 0.05 ruthenium | 0.3 indium | 82.7 | 82.7 |

TABLE II-continued

| CATA-LYST No | METAL CONTENT IN % BY WEIGHT RELATIVE TO THE CATALYST CARRIER | | | YIELD % C$_5^+$ (weight) | RECYCLED GAS % H$_2$ (Moles) |
|---|---|---|---|---|---|
| 21 | 0.30 platinum | 0.05 iridium | 0.3 indium | 82.3 | 82.6 |

EXAMPLE 3 (comparative)

In this example, the process is conducted in the presence of catalysts No. 22 to 26 containing on the one hand, a noble metal from the platinum family, other than platinum itself and, on the other hand, indium. The metal contents of catalysts 22 to 26 and the results obtained with these catalysts are reported in Table III below. As expected, these results are not satisfactory as compared to those of Table II since it has been observed from Table I that catalysts 7 to 15 which do not contain platinum but associations metals of the platinum family other than platinum itself, gave by themselves poor results.

TABLE III

| CATA-LYST No | METAL CONTENT IN % BY WEIGHT RELATIVE TO THE CATALYST CARRIER | | YIELD % C$_5^+$ (weight) | RECYCLED GAS % H$_2$ (Moles) |
|---|---|---|---|---|
| 22 | 0.35 iridium | 0.3 indium | 80.0 | 78.2 |
| 23 | 0.35 rhodium | 0.3 indium | 79.8 | 79.3 |
| 24 | 0.35 ruthenium | 0.3 indium | 80.2 | 79.8 |
| 25 | 0.35 palladium | 0.3 indium | 82.0 | 82.3 |
| 26 | 0.35 osmium | 0.3 indium | 78.7 | 78.9 |

EXAMPLE 4 (according to the invention)

The operation is conducted in the presence of catalyst No. 27 to 33 containing, on the one hand, two metals of the platinum family, other than platinum itself and, on the other hand, indium.

For example, catalyst 27 has been prepared in the following manner: To 100 g of alumina were added 100 cc of an aqueous solution containing:

2.00 g of an aqueous solution of ruthenium trichloride containing 2.5% by weight of Ru.
2.24 g of concentrated HCl (d=1.19).
12 g of an aqueous solution of chloroiridic acid containing 2.5% by weight of Ir.
2.04 g of indium nitrate (In (NO$_3$)$_3$, 5 H$_2$O).

After 5 hours of contact, the resulting product is dried for 1 hour at 100° C., and then roasted for 4 hours at 530° C. in dry air (drying with activated alumina). Then the reduction is performed in a dry hydrogen stream (activated alumina) for 2 hours at 450° C. The resulting catalyst contains, by weight with respect to the catalyst carrier:

0.30% of iridium
0.3% of indium
0.05% of ruthenium
1.12% of chlorine

Catalyst 29, for example, has been prepared in the following manner: To 100 g of alumina were added 100 cc of an aqueous solution containing:

2.00 g of palladium nitrate solution containing 2.5% by weight of Pd,
2.24 g of concentrated HCl (d=1.19).
12 g of an aqueous solution of rhodium trichloride containing 2.5% by weight of Rh, and
2.04 g of indium nitrate (In (NO$_3$)$_3$, 5H$_2$O)

After 5 hours of contact, the resulting product is dried for 1 hour at 100° C., then calcined for 4 hours at 530° C. in dry air (drying by means of activated alumina). Then it is reduced in a stream of dry hydrogen (activated alumina) for 2 hours at 450° C. The resulting catalyst has the following contents, expressed by weight with respect to the catalyst carrier:

0.30% of rhodium
0.05% of palladium
0.30% of indium
1.12% of chlorine.

Catalyst No. 32 has, for example, been prepared in the following manner: To 100 g of alumina were added 100 cc of an aqueous solution containing:

2.00 g of palladium nitrate solution containing 2.5% by weight of Pd,
2.24 g of concentrated HCl (d=1.19),
12 g of an aqueous solution of ruthenium trichloride containing 2.5% by weight of Ru, and
2.04 g of indium nitrate (In (NO$_3$)$_3$, 5H$_2$O).

After a 5 hour contact the resulting product is dried for one hour at 100° C., then calcined for 4 hours at 530° C. in dry air (drying with activated alumina), and then reduced in a stream of dry hydrogen (activated alumina) for 2 hours at 450° C. The resulting catalyst contains, expressed by weight with respect to the catalyst carrier:

0.30% of ruthenium
0.05% of palladium
0.30% of indium
1.12% of chlorine

All the other catalysts were prepared according to similar methods which need not to be further described here.

The metal contents of catalysts No. 27 to 33 and the results obtained with these catalysts are reported in Table IV below.

As, on the one hand, the associations of noble metals of the platinum family, except platinum itself, have produced according to example 1 (catalysts 7 to 15) less satisfactory results than catalyst 1 to 6 containing platinum, and as, on the other hand, the addition of indium to catalysts containing one metal of the platinum family other than platinum (such as catalysts 22 to 26), did not result in a significant improvement of such catalysts, it would have been expected that the addition of indium to combinations of two metals of the platinum family, other than platinum, would not result in any substantial improvement of catalysts such as 7 to 15.

On the contrary, it is observed that, on the one hand, the use of catalysts 27 to 33, which do not contain platinum, results in a very substantial improvement of the yields as compared with the use of catalysts 7 to 15, and it is even observed that, on the other hand, the yields obtained with catalysts 27 to 33 which do not contain platinum, are, in some cases, slightly higher than those obtained by using catalysts 16 to 21 containing platinum, indium and, optionally, a promoter consisting of another noble metal of the platinum family.

indium and mainly under particularly severe conditions in order to obtain a gasoline of very high octane number.

The present example concerns the treatment of the feed-stock used in examples 1 to 5 in order to produce a gasoline having a clear octane number of 103. Various

TABLE IV

| CATA-LYST No | METAL COMPOSITION IN % BY WEIGHT WITH RESPECT TO THE CATALYST CARRIER | | | YIELD % $C_5^+$ (weight) | RECYCLED GAS % $H_2$ (Moles) |
|---|---|---|---|---|---|
| 27 | 0.30 iridium | 0.05 ruthenium | 0.3 indium | 82.8 | 82.8 |
| 28 | 0.30 iridium | 0.05 palladium | 0.3 indium | 82.6 | 82.2 |
| 29 | 0.30 rhodium | 0.05 palladium | 0.3 indium | 82.8 | 82.6 |
| 30 | 0.30 rhodium | 0.05 osmium | 0.3 indium | 82.6 | 82.8 |
| 31 | 0.30 rhodium | 0.05 ruthenium | 0.3 indium | 82.8 | 82.8 |
| 32 | 0.30 ruthenium | 0.05 palladium | 0.3 indium | 82.6 | 82.5 |
| 33 | 0.30 ruthenium | 0.05 osmium | 0.3 indium | 82.5 | 82.6 |

EXAMPLE 5

Example 4 is repeated with some catalysts of the invention having various indium contents and various contents of noble metals. The contents of metal elements and the obtained results are reported in Table V below.

catalysts, some of which do not conform with the invention, are used.

The operating conditions are as follows:

| - pressure | 10 bars |
|---|---|
| - temperature | 530° C. |
| - ratio $H_2$/hydrocarbons (moles) | 8 |

TABLE V

| CATA-LYST No | METAL COMPOSITION IN % BY WEIGHT WITH RESPECT TO THE CATALYST CARRIER | | | YIELD % $C_5^+$ (weight) | RECYCLED GAS % $H_2$ (Moles) |
|---|---|---|---|---|---|
| 27 | 0.30 iridium | 0.05 ruthenium | 0.3 indium | 82.8 | 82.8 |
| 34 | 0.30 iridium | 0.05 ruthenium | 0.004 indium | 79.5 | 78.3 |
| 35 | 0.30 iridium | 0.05 ruthenium | 0.07 indium | 80.9 | 81.2 |
| 36 | 0.30 iridium | 0.05 ruthenium | 0.6 indium | 82.7 | 82.7 |
| 37 | 0.30 iridium | 0.05 ruthenium | 1.0 indium | 82.3 | 82.5 |
| 38 | 0.30 iridium | 0.05 ruthenium | 4.0 indium | 81.6 | 81.7 |
| 39 | 0.05 iridium | 0.30 ruthenium | 0.3 indium | 81.4 | 81.5 |
| 40 | 0.03 iridium | 0.8 ruthenium | 0.3 indium | 80.1 | 79.9 |
| 41 | 0.5 iridium | 0.09 ruthenium | 0.3 indium | 81.7 | 81.5 |
| 29 | 0.30 rhodium | 0.05 palladium | 0.3 indium | 82.8 | 82.6 |
| 42 | 0.30 rhodium | 0.05 palladium | 0.004 indium | 79.6 | 79.0 |
| 43 | 0.30 rhodium | 0.05 palladium | 0.6 indium | 82.4 | 82.5 |
| 30 | 0.30 rhodium | 0.05 osmium | 0.3 indium | 82.6 | 82.8 |
| 44 | 0.30 rhodium | 0.05 osmium | 0.004 indium | 78.9 | 79.2 |
| 45 | 0.30 rhodium | 0.05 osmium | 0.6 indium | 82.5 | 80.7 |
| 46 | 0.05 rhodium | 0.30 osmium | 0.3 indium | 77.3 | 78.5 |
| 31 | 0.30 rhodium | 0.05 ruthenium | 0.3 indium | 82.8 | 82.8 |
| 47 | 0.30 rhodium | 0.05 ruthenium | 0.004 indium | 79.2 | 78.4 |
| 48 | 0.30 rhodium | 0.05 ruthenium | 0.6 indium | 82.0 | 82.4 |
| 49 | 0.30 palladium | 0.05 rhodium | 0.3 indium | 81.5 | 81.4 |

EXAMPLE 6

The production of gasoline of very high octane number requires operating under very severe conditions which the catalysts used, up to now, do not withstand easily. The use of bimetallic catalysts has, however, resulted in a significant improvement but, unhappily, some of the noble metals of the platinum family which, when associated by 2 or even by 3, result in very good stability properties, also introduce a certain tendency to hydrogenolysis, which results in a definitive loss of yield, in a shortening of the cycle as well as in a decrease of the number of possible cycles, i.e. in a decrease of the catalyst life time. It has been observed that this hydrogenolyzing tendency is substantially decreased by the presence of indium and the performances due to the latter are of particular importance in the case of severe operating conditions, particularly under low pressures, high temperatures and long periods of operation.

The present example shows that it is possible and even very advantageous to proceed according to the invention in the presence of specific catalysts containing

| - naphtha weight/catalyst weight/hour | 1.65 |
|---|---|

Table VI indicates the $C_5^+$ yield obtained after 200 hours and the hydrogen content of the recycled gas. By way of comparison, when operating in the same conditions with catalysts containing only indium and a single metal of group VIII, the results are those reported in the same table. All the catalysts contain 1.12% of chlorine by weight.

The results obtained in said example VI with the catalysts according to the invention may be maintained over very long periods of time, for example, several months, by operating continuously in a moving bed reactor, the catalyst being for example withdrawn continuously at a rate so adjusted that all the catalyst bed of the reactor is progressively renewed by fresh catalyst in, for example, about 500 hours.

Catalyst No. 50 has been prepared in a manner similar to that previously indicated:

To 100 g of alumina were added 100 cc of an aqueous solution containing:
2.04 g of indium nitrate (In(NO$_3$)$_3$, 5H$_2$O)
2.24 g of concentrated HCl (d=1.19)
12 g of an aqueous solution of chloroiridic acid containing 2.5% by weight of Ir, and
2.00 g of an aqueous solution of rhodium trichloride containing 2.5% by weight of Rh.

After 5 hours of contact, the resulting product is dried for 1 hour at 100° C., then roasted for 4 hours at 530° C. in dry air (drying by means of activated alumina), and then reduced in a stream of dry hydrogen (activated alumina) for 2 hours at 450° C.

The resulting catalyst has the following contents with respect to the catalyst carrier:
0.30% of iridium
0.05% of rhodium
0.3% of indium
1.12% of chlorine.

Catalyst No. 51 has been prepared in the same manner as catalyst No. 50, by replacing the 2 grams of aqueous solution of rhodium trichloride with 2 grams of aqueous solution of osmium trichloride containing 2.5% by weight of Os.

Catalyst No. 51 has the following contents by weight, expressed with respect to the catalyst carrier:
0.30% of iridium
0.05% of osmium
0.3% of indium
1.12% of chlorine.

TABLE VI

| CATALYST No | METAL COMPOSITION IN % BY WEIGHT WITH RESPECT TO THE CATALYST CARRIER | | | YIELD % C$_5$+ (weight) | RECYCLED GAS % H$_2$ (Moles) |
|---|---|---|---|---|---|
| 27 | 0.30 iridium | 0.05 ruthenium | 0.3 indium | 79.6 | 78.8 |
| 22 | 0.35 iridium | — | 0.3 indium | 77.3 | 77.5 |
| 7 | 0.30 iridium | 0.05 ruthenium | — | 75.3 | 76.1 |
| 28 | 0.30 iridium | 0.05 palladium | 0.3 indium | 79.7 | 78.5 |
| 8 | 0.30 iridium | 0.05 palladium | — | 76.1 | 76.5 |
| 50 | 0.3 iridium | 0.05 rhodium | 0.3 indium | 79.4 | 78.6 |
| 9 | 0.3 iridium | 0.05 rhodium | — | 76.2 | 76.8 |
| 51 | 0.3 iridium | 0.05 osmium | 0.3 indium | 79.3 | 78.7 |
| 10 | 0.3 iridium | 0.05 osmium | — | 76.5 | 76.3 |
| 31 | 0.3 rhodium | 0.05 ruthenium | 0.3 indium | 79.7 | 78.6 |
| 23 | 0.35 rhodium | — | 0.3 indium | 77.1 | 77.5 |
| 13 | 0.3 rhodium | 0.05 ruthenium | — | 75.8 | 76.3 |
| 29 | 0.3 rhodium | 0.05 palladium | 0.3 indium | 79.2 | 78.3 |
| 11 | 0.3 rhodium | 0.05 palladium | — | 76.5 | 76.8 |
| 30 | 0.3 rhodium | 0.05 osmium | 0.3 indium | 79.2 | 78.7 |
| 12 | 0.3 rhodium | 0.05 osmium | — | 76.6 | 76.7 |
| 32 | 0.3 ruthenium | 0.05 palladium | 0.3 indium | 79.9 | 78.9 |
| 24 | 0.35 ruthenium | — | 0.3 indium | 77.3 | 77.6 |
| 14 | 0.3 ruthenium | 0.05 palladium | — | 75.9 | 76.5 |
| 33 | 0.3 ruthenium | 0.05 osmium | 0.3 indium | 79.8 | 78.7 |
| 15 | 0.3 ruthenium | 0.05 osmium | — | 76.5 | 77.1 |

In the present case the more efficient catalysts are those containing:
ruthenium, palladium and indium
ruthenium, osmium and indium
rhodium, ruthenium and indium
iridium, ruthenium and indium.

What we claim is:

1. In a catalytic reforming process conducted under reforming conditions and yielding a gasoline having a clear octane number of at least 103, the improvement wherein the process is conducted in the presence of a catalyst containing an alumina carrier and, expressed by weight with respect to the catalyst carrier:
(a) 0.2 to 0.4% of a first metal which is ruthenium,
(b) 0.03 to 0.08% of a second metal which is palladium,
(c) 0.07 to 2% of a third metal which is indium, and
(d) 0.1 to 10% of a halogen.

2. A process according to claim 1, conducted in a reaction zone having a moving bed of catalyst.

3. In a catalytic reforming process conducted under reforming conditions and yielding a gasoline having a clear octane number of at least 103, the improvement wherein the process is conducted in the presence of a catalyst containing an alumina carrier and, expressed by weight with respect to the catalyst carrier:
(a) 0.2 to 0.4% of a first metal which is ruthenium,
(b) 0.03 to 0.08% of a second metal which is osmium,
(c) 0.07 to 2% of a third metal which is indium, and
(d) 0.1 to 10% of a halogen.

4. A process according to claim 3, conducted in a reaction zone having a moving bed of catalyst.

5. In a catalytic reforming process conducted under reforming conditions and yielding a gasoline having a clear octane number of at least 103, the improvement wherein the process is conducted in the presence of a catalyst containing an alumina carrier and, expressed by weight with respect to the catalyst carrier:
(a) 0.2 to 0.4% of a first metal which is rhodium,
(b) 0.03 to 0.08% of a second metal which is ruthenium,
(c) 0.07 to 2% of a third metal which is indium, and
(d) 0.1 to 10% of a halogen.

6. In a catalytic reforming process conducted under reforming conditions and yielding a gasoline having a clear octane number of at least 103, the improvement wherein the process is conducted in the presence of a catalyst containing an alumina carrier and, expressed by weight with respect to the catalyst carrier:
(a) 0.2 to 0.4% of a first metal which is iridium,
(b) 0.03 to 0.08% of a second metal which is ruthenium,
(c) 0.07 to 2% of a third metal which is indium, and
(d) 0.1 to 10% of a halogen.

7. A process according to claim 5, conducted in a reaction zone having a moving bed of catalyst.

8. A process according to claim 6, conducted in a reaction zone having a moving bed of catalyst.

* * * * *